May 7, 1968 J. B. DE COURVILLE 3,382,486

SORTING APPARATUS FOR COLLECTING COMMON ADDRESS DATA FROM AN ORIGINAL MEMORY IN WHICH UNSORTED DATA AND ADDRESSES ARE REGISTERED

Filed June 29, 1965 2 Sheets-Sheet 1

INVENTOR
Jacqueline BERNARD de COURVILLE
BY
Abraham A. Saffitz
ATTORNEY

INVENTOR
Jacqueline BERNARD de COURVILLE
BY
Abraham A. Saffitz
ATTORNEY

United States Patent Office 3,382,486

Patented May 7, 1968

3,382,486

SORTING APPARATUS FOR COLLECTING COMMON ADDRESS DATA FROM AN ORIGINAL MEMORY IN WHICH UNSORTED DATA AND ADDRESSES ARE REGISTERED

Jacqueline Bernard de Courville, 4 Rue du Figuier, Paris, France

Filed June 29, 1965, Ser. No. 468,020
Claims priority, application France, June 30, 1964, 980,176
3 Claims. (Cl. 340—172.5)

ABSTRACT OF THE DISCLOSURE

Sorting apparatus and method for collecting registered unsorted data from an original memory, each of the data being provided with an address wherein all of the data having a common address is sorted out and transferring means transports said sorted data to an output memory in a predetermined order of sorted addresses. The original memory is read cyclically a plurality of times. During each reading the first new address in said predetermined order is selected and during each reading cycle after the first, every data relating to the address selected at the previous reading cycle is transferred into the output memory.

Figure 1:
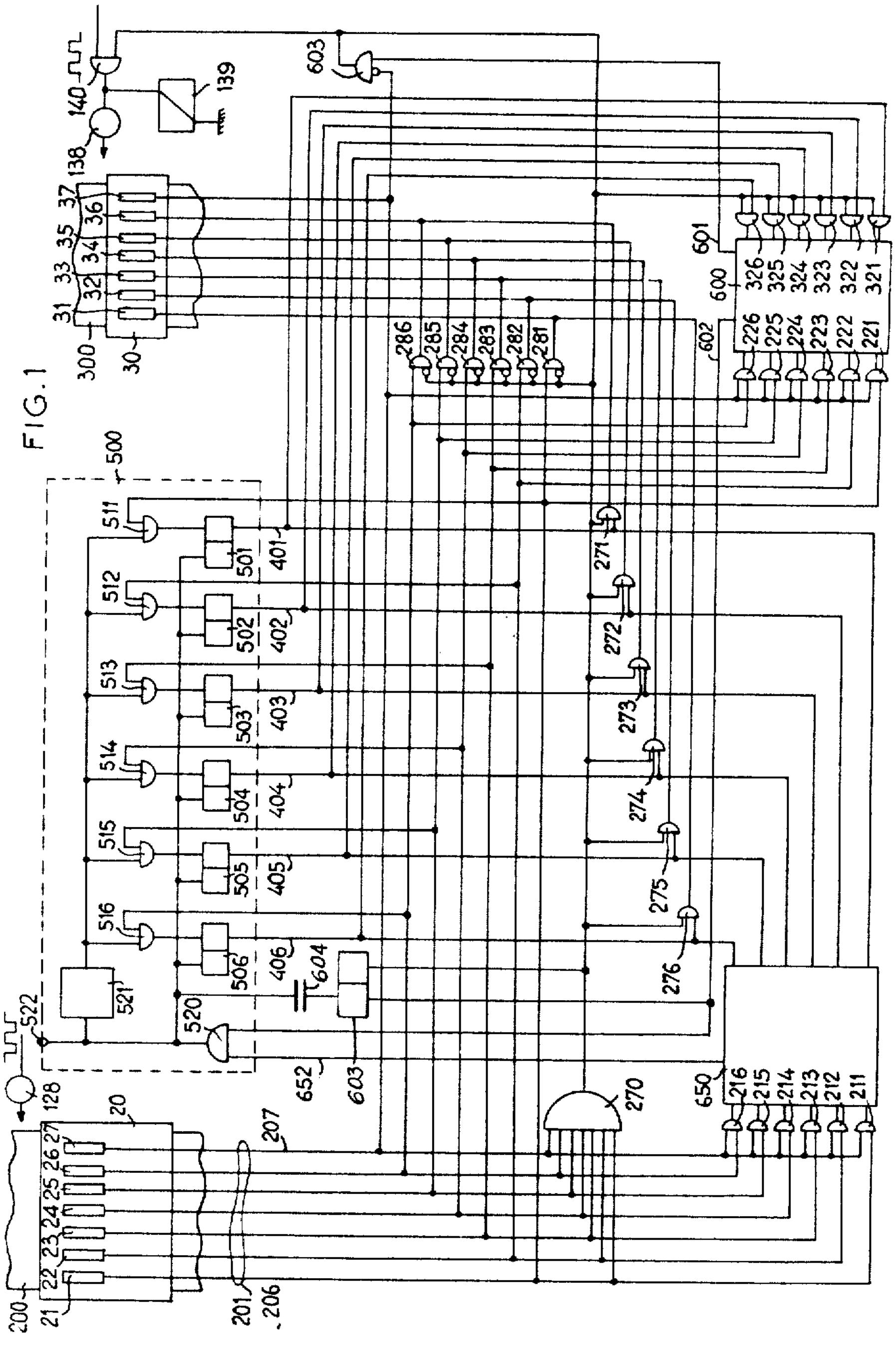

The present invention relates to a sorting method and apparatus, for categorizing or apportioning information data of different kinds, and more particularly to a system for collecting from an original memory, in which data each provided with an address and registered at random, the said data in the order of the increasing addresses thereof.

Data apportioning devices are known in the prior art which comprise means for reading out cyclically a number of times an original memory containing data and addresses thereof in which the addresses are not classified, means for marking said addresses with a checking mark or notch, means for reading-out said checking marks or notches, means for recording in a temporary memory the first address of the original memory not provided with a checking mark which is encountered in the course of a reading cycle, means for comparing the successive addresses in the original memory with the address recorded in the temporary memory, means controlled by said comparison means for transferring to an output memory the data relating to addresses which the comparison means have found to be identical with the address recorded in the temporary memory, and means for controlling the means for writing-in the checking marks for the purpose of marking the addresses the data of which have been transferred.

It is seen that this device makes it possible to extract from the original memory all the data relating to each of the addresses contained therein and to collect all the data having a common address, whichever their location in the original memory may be in an output memory in which the addresses are arranged in the order in which they are presented for the first time in the original memory, the marking of the addresses of the data which have been already transferred being thus necessary.

The object of the present invention is to improve a device of this type so that the addresses will be classified in the output memory in a predetermined order.

Apart from the advantage provided by such classification, this improvement has the advantage of eliminating the marking in the original memory of the addresses of the data which have been transferred, and consequently making it possible to keep said memory in its original state, particularly when it is in the form of a punched tape while at the same time saving on said tape the track previously required for marking.

According to the present invention a device for classification and apportionment of data each provides with an address comprises means for reading cyclically a plurality of times an original memory containing addresses, data, and an end-of-tape signal, a temporary memory for the provisional recording of addresses read from said original memory, a permanent output memory for recording on each reading cycle an address originating from the temporary memory and data relating to said address originating from the original memory, first means of comparison between the addresses of the original memory and the addresses of the temporary memory, second means of comparison between the addresses of the original memory and the last address recorded in the output memory, means controlled by said first and second comparison means to record in said temporary memory that address from the original memory which is in predetermined order of the lowest rank and is at a rank above that of the last address recorded in the output memory, means for transferring to the output memory, in response to the end-of-tape signal, the address contained in the temporary memory and, in dependence on said second comparison means, the data relating to the last-mentioned address.

Figure 2:
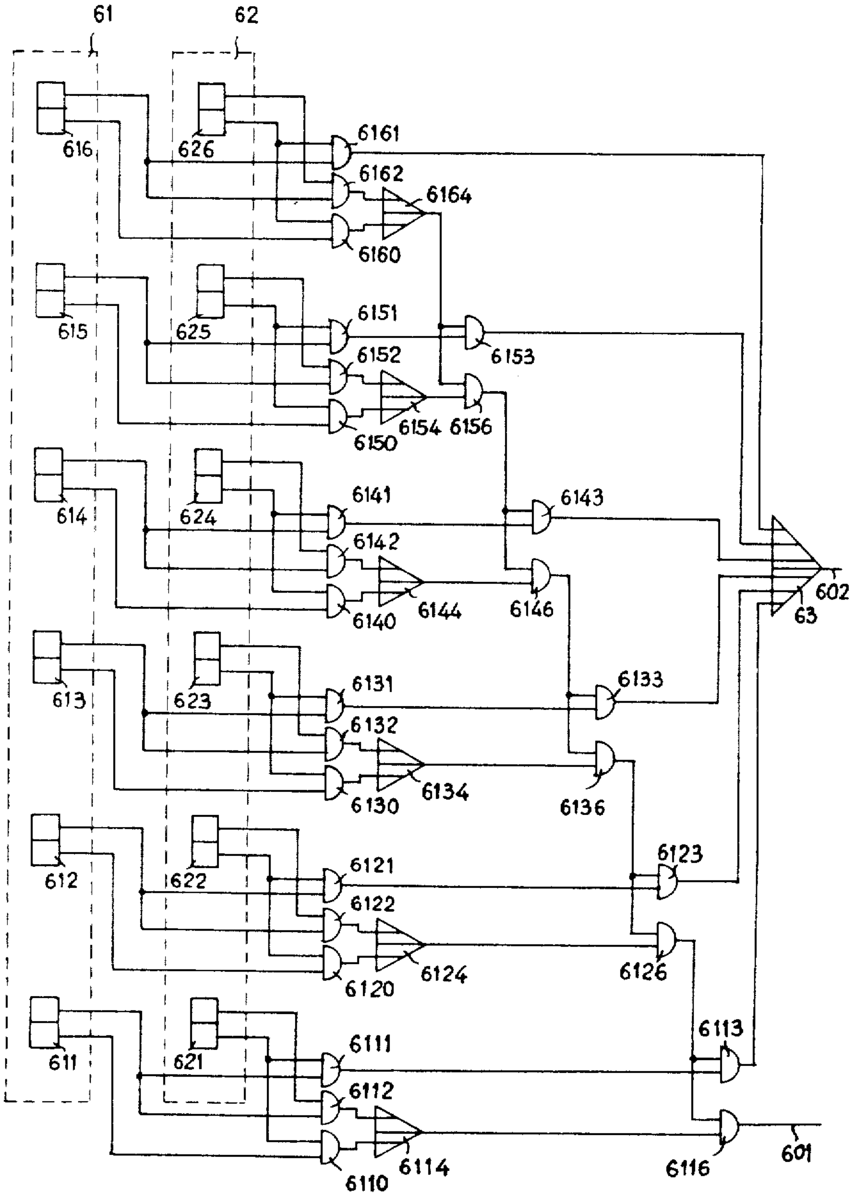

The invention will now be described in detail with reference to an example in which the original and output memories are punched tapes and the temporary memory is a flip-flop register, in conjunction with the accompanying drawings, in which:

FIG. 1 illustrates in the form of a block diagram the device of the invention; and FIG. 2 illustrates in detail a comparator of binary numbers comprised in the device of FIG. 1.

Referring to the drawing, 200 designates the original tape and 300 the output tape. The punched tape 200 differs from that of the prior art devices only in the elimination of the checking track; it therefore has seven tracks, six data tracks and the seventh which is the address recognition track. It is read-out by a reader 20 equipped with six data feelers 21 to 26 and an address feeler 27 associated with the address recognition track, and its movement is effected by the step-by-step motor 128. The output tape 300 driven by the step-by-step motor 138 passes beneath the perforator 30 having seven punches 31–37, the general electromagnet of which is designated by 139. The motor 138 and the electromagnet 139 are energized in synchronism with the step-by-step motor 128 by means of an AND gate 140, the conditions of unblocking of which will be explained hereinbelow. Of course conventional means are used for punching the tape before advancing it.

The output wires 201–206 ofthe first six data feelers 21–26 of the reader 20 are connected respectively:

To the first six inputs of a six-figure binary number comparator 650 through six AND gates 221–216 having their second inputs connected to the address feeler 27 by the wire 207;

To six inputs of an AND gate 270 having seven inputs, the seventh input of which is connected to the wire 207;

To six inputs of a temporary memory 500;

To the first six inputs of a six-figure binary number comparator 600 through six AND gates 221–226 having their second input connected to the wire 207;

Through six inhibition gates 281–286 having their inhibition input connected to the output of the gate 270 to the six electromagnets for the punches 31–36 of the perforator 30, these electromagnets being also connected to the outputs of six AND gates 271–276.

The temporary memory 500 is illustrated by way of example as being constituted by a register comprising six flip-flops 501–506 having their positioning inputs 1 connected respectively to the wires 201–206 through AND gates 511–516, the second inputs of which are connected through a delay line 521 to the output of an AND gate 520 which is also connected to the reset input of the same flip-flops, to a starting terminal 522 and to the output of a flip-flop 603 through a capacitor 604. The input and the reset input of the flip-flop 603 are respectively connected to an output connection wire 602 of the comparator 600 and to the output of the gate 270. The outputs 1 of the flip-flops 501–506 are respectively connected by the wires 401–406 to the six second inputs of the comparator 650, to the six second inputs of the comparator 600 through six AND gates 321–326 having their second input connected to the output of the gate 270, and to the first inputs of the gates 271–276, the second inputs of which are likewise connected to the output of the gate 270.

The comparators 650 and 600 thus have the object of comparing each of the addresses of the original tape 200, the first with the address recorded in the temporary memory 500 and the second with the last address transferred to the output memory 300. When the address of the original tape 200 applied to the left hand side of comparator 600 is identical with the address of the output tape 300, which, when it was transferred from register 500 to perforator 30, has simultaneously been recorded in the right hand side of comparator 600, the latter supplies a signal to the connecting wire 601. This signal is blocked by an inhibition gate 603 when a signal is present on the wire 207, that is to say whenever the address identical with that on the output tape is still beneath the reader 20, in order to avoid its repetition on the tape 300. When the gate 603 permits passage after the tape 200 has moved on, the address identity signal present on the wire 601 unblocks the gate 140, through which the electromagnet 139 of the perforator 30 and the step-by-step motor 138 for the output tape 300 are energized in synchronism with the motor 128. When the address of the original tape 200 is a binary number larger than the address of the output tape, the comparator 600 applies a signal through the connecting wire 602 to one of the two inputs of the gate 520. When the address of the original tape is a smaller binary number than the address recorded in the temporary memory 500, the comparator 650 applies to the second input of the gate 520, through the wire 652, a signal which effects the resetting of the six flip-flops 501–506, and then the positioning of the latter in conformity with the address read by the reader 20 on the original tape 200.

At the end of each reading cycle, the end-of-tape signal gives rise to an output signal of the gate 270 which controls the transfer of the address in register 500 to memory 300 and resets the flip-flop 603 to zero whereby the signal supplied by the comparator 600 on the wire 602, when an address larger than the new address recorded in memory appears in the memory 200, controls the transfer of said larger address into the register 500.

Summarizing what has been disclosed up to now, comparator 600 compares during each reading cycle the successive addresses stored in memory 200 to the last transferred address toward in memory 300; in the case of the address identity, comparator 600 controls the data transfer from memory 200 to memory 300 and in the case where the address in 200 is larger than the last transferred address stored in 300, comparator 600 controls the transfer of the first of said larger addresses from memory 200 into memory 500 and prepares the transfer into memory 500 of the following addresses in memory 200 which are smaller than the address previously stored in memory 500; this second condition is controlled by comparator 650. Consequently during each cycle, two operations proceed simultaneously: the transfer from 200 to 300 of the data having at their address the last transferred address stored in 300, and the search and record in 500 of the smallest address in 200, but larger than the address in 300.

Binary number comparators capable of fulfilling the functions described above for the comparators 600 and 650 are well known in the art. By way of example, FIG. 2 illustrates one form of construtcion of the comparator 600. The latter comprises a first register 61 composed of six flip-flops 611–616, in which there are recorded respectively the six binary digits of each of the successive addresses read-out on the tape 200 by the data feelers 21–26 and identified as an address by the feeler element 27, and a second register 62 composed of six flip-flops 621–626 in which there are respectively recorded the six binary digits of each of the addresses successively recorded on the output tape 300 in response to the end-of-tape signal.

This recording in 600 of the address from 200 is effected through gates 221–226 on the one hand and the recording of the address from 300 is effected through gates 321–326 on the other hand, it being understood that the resetting of the flip-flops in which these figures must be recorded can be effected by a general return preceding the recording, as indicated for the temporary memory 500 or by any other known means. The principle of this comparator is that the number recorded in the register 61 is greater than the number recorded in the register 62 if for the first pair of flip-flops of the same rank of the two registers, starting from the highest order, which are in different states, the flip-flop of the register 61 is in one state and the corresponding flip-flop of the register 62 in zero state.

The one output of the flip-flop 616 of the highest order in the register 61 and the zero output of the corresponding flip-flop 626 in the register 62 are thus connected through an AND gate 6161 to one input of an OR gate 63, the output of which is connected to the wire 602. The one output on the one hand and the zero output on the other hand of the flip-flops 616 and 626 are connected to the two inputs of an OR gate 6164 through the medium of the AND gates 6162 and 6160. A signal thus appears at the output of the gate 6164 when the two flip-flops 616, 626 are in the same state. This output signal frees the AND gates 6153, 6156 respectively in series with the gates 6151 and 6154, the first of which supplies a signal if the flip-flop 615 is in one state and the flip-flop 625 in zero state, and the second of which supplies a signal if these two flip-flops are in the same state. The output of the gate 6153 is connected to the wire 602 through the gate 63 and the output of the gate 6156 controls the output gates 6143 and 6146 of the circuits comparing the state of the flip-flops 614, 624. The same diagram is reproduced as many times as there are stages of the registers to be compared, each stage supplying on the one hand a signal on the wire 602 if, the corresponding flip-flops of the stages of higher order being in the same state, the flip-flop of the register 61 of the stage considered is in one state and the corresponding flip-flop of the register 62 in zero state, and on the other hand a release signal at the outputs of the comparison circuits of the immediately lower stage when the flip-flops of the circuit considered are in the same state. The output signal of the gate 6116 indicating that, all the stages of the two registers having their corresponding flip-flops in the same state, the numbers recorded in these two registers are identical, is applied to the wire 601.

The operation of the arrangement of the invention is as follows:

At the commencement of the reading of the original tape 200, the latter is so arranged that its first address is beneath the reader 20. When a start is made, a signal is applied, by means not illustrated, on the one hand to the terminal 522 of the temporary memory 500 in order to effect the resetting of the flip-flops 501–506 and, after a short delay due to the delay line 521, the freeing of the gates 511–516, which has the effect of recording in the flip-flops 501–506 the first address of the tape 200, and on the other hand to a resetting input, not illustrated, of the register 62 in the comparator 600. In the first cycle of reading the tape 200, all the addresses contained on the latter being higher than zero (the zero address is not used in memory 200), the comparator 600 permanently supplies a signal on a wire 602 and each of the successive addresses of the tape 200 is compared in the comparator 650 with the address recorded in the temporary memory 500. Whenever the address read by the reader 20 on the tape 200 is lower than the address recorded in the temporary memory 500, the comparator 650 supplies on the wire 652 a signal which passes through the gate 520, resets the flip-flops 501–506 and then frees the gates 511–516, which have the effect that the flip-flops 501–506 receive through the wires 201–206 the signals received by the feelers 21–26. After the reading of the last address on the tape 200, the address recorded in the temporary memory 500 is the smallest of the addresses written-in on this original tape. The end-of-tape signal, which is a special signal containing the binary digit one in each of the seven tracks of the tape 200, gives rise to an output signal of the gate 270 which has the effect:

Of insulating the wires 201–206 of the electromagnets controlling the punches 31–37 of the perforator 30 by blocking the inhibition gates 281–286;

Of freeing the gates 271–276 through the medium of which the electromagnets of the punches 31–36 are or are not energized depending on whether the flip-flops 501–506 are in one state or zero state;

Of freeing the gate 140 permitting the control of the general electromagnet 139 of the perforator 30 and of the motor 138 driving the output tape 300;

Of freeing the gates 321–326 through which the address recorded in the temporary 500 is transferred to the register 62 of the comparator 600;

Of resetting the flip-flop 603 to zero.

In the following reading cycle of the original tape 200, two operations are carried out simultaneously, the recording on the output tape 300 of all the data of the tape 200 which relate to the address thus transferred, and the selection of the smallest address after that address.

The recording of the data relating to the last address recorded on the output tape 300 is controlled by the comparator 600 which supplies a signal on the wire 601 whenever the addresses recorded in its registers 61 and 62 are identical, that is to say the last address read on the tape 200 by the reader 20 is identical with the last address recorded on the tape 300. The electromagnets of the punches 31–36 being or not being energized by the wires 201–206 depending on whether the binary figures read-out by the data feelers 21–26 are one or zero, the signal appearing on the wire 601 permits the energization of the general electromagnet 139 of the perforator 30 and the advance of the tape 300 by means of the motor 138 in synchronism with the advance of the original tape 200, provided that there is no signal present on the wire 207 so as to avoid the repetition of the recording on the tape 300 of the address being handled whenever it is presented on the original tape 200.

The selection of the smallest address after the address being treated is effected like the selection of the preceding address, with the difference that the gates 511–516 are freed only when the presence of a signal on the wire 602 indicates that the address read on the tape 200 is greater than the address being handled.

The addresses of the original tape 200 are thus transferred one by one in increasing order after each reading cycle to the output tape 300, on which all the data relating thereto are recorded after each of them. At the end of the process, all the data are arranged on tape 300 by increasing order of the addresses thereof.

What I claim is:

1. A sorting apparatus for unsorted data each provided with an address and recorded in an original memory in which is also recorded an end-of-tape signal, comprising means for cyclically reading a plurality of times said unsorted data and addresses therefor and end-of-tape signal in said original memory, a single stage temporary memory to which sorted addresses are transferred from said original memory, a permanent output memory to which sorted addresses are transferred from said temporary memory and sorted data are transferred from said original memory, first means of comparison between the addresses of the original memory and the address of said temporary memory, second means of comparison between the addresses of the original memory and the last address recorded in the output memory, means controlled by said first and second comparison means for recording in said temporary memory that address from the original memory which has the lowest rank above the rank of the last address recorded in the output memory, and means for transferring to the output memory the address contained in the temporary memory in response to the end-of-tape signal and the data relating to the last-mentioned address from the original memory in dependence on said second comparison means.

2. A sorting apparatus for unsorted data each provided with an address and recorded in an original memory also containing an end-of-tape signal, comprising, in combination, means for cyclically reading a plurality of times said unsorted data and addresses therefor and end-of-tape signal recorded in said original memory, a single stage temporary memory to which storted addresses are transferred from said original memory, first comparison means between the addresses of the original memory and the address of the temporary memory, an output memory to which sorted addresses are transferred from said temporary memory and sorted data from said original memory, means for recording successively in said temporary memory during each reading cycle the first address read-out from the original memory greater than the last address recorded in the output memory and the subsequent addresses read-out from the original memory greater than the last address recorded in the output memory and smaller than the address recorded in the temporary memory, and transfer means for transferring to the output memory the address contained in the temporary memory in response to the end-of-tape signal and during the following reading cycle, every data relating to the last-mentioned address from the original memory in dependence on said second comparison means.

3. A sorting device for apportioning unsorted data of different kinds, which are scattered in an original memory, according to the respective addresses thereof and which orders said data in the increasing order of said addresses comprising, in combination, reading means for cyclically reading-out said original memory, an output memory to which ordered data are transferred in increasing order of addresses, a temporary buffer memory, selector-recording means for cyclically selecting the smallest of the addresses in the original memory, though greater than the last address in the output memory, and for writing-in said smallest address in the temporary buffer memory, first transfer means for recurrently transferring said smallest address from said temporary buffer memory to said output memory at the end of each cycle, and second transfer means for cyclically transferring the data written in said original memory, whose addresses are identical with the address transferred into the output memory, into said output memory.

References Cited

UNITED STATES PATENTS

| | | | |
|---|---|---|---|
| 3,034,103 | 5/1962 | Underwood | 340—172.5 |
| 2,983,904 | 5/1961 | Moore | 340—172.5 |
| 2,987,705 | 6/1961 | Van Mechelen | 340—172.5 |

PAUL J. HENON, *Primary Examiner.*

ROBERT C. BAILEY, *Examiner.*

G. D. SHAW, *Assistant Examiner.*